(12) United States Patent
Ostapchuck

(10) Patent No.: US 6,788,779 B2
(45) Date of Patent: Sep. 7, 2004

(54) METHOD AND APPARATUS FOR ROUTING CALLS BY PROXY USING VIRTUAL TRANSACTION SERVERS IN A MULTI-TENNANT COMMUNICATION CENTER

(75) Inventor: Yuri Ostapchuck, San Mateo, CA (US)

(73) Assignee: Genesys Telecommunications Laboratories, Inc., Daly City, CA (US)

(*) Notice: Subject to any disclaimer, the term of this patent is extended or adjusted under 35 U.S.C. 154(b) by 483 days.

(21) Appl. No.: 09/912,770

(22) Filed: Jul. 24, 2001

(65) Prior Publication Data
US 2003/0021406 A1 Jan. 30, 2003

(51) Int. Cl.[7] .................. H04M 1/64; H04M 3/523; H04M 3/42
(52) U.S. Cl. ............... 379/265.02; 379/88.17; 379/88.18; 379/201.02; 379/265.09
(58) Field of Search .............. 379/265.02, 88.01, 379/88.02, 88.18, 88.17, 201.02, 265.09

(56) References Cited

U.S. PATENT DOCUMENTS 6,427,002 B2 * 7/2002 Campbell et al. ........ 379/88.01
6,442,247 B1 * 8/2002 Garcia .................... 379/88.18
6,496,567 B1 * 12/2002 Bjornberg et al. ....... 379/88.02

* cited by examiner

Primary Examiner—Harry S. Hong
(74) Attorney, Agent, or Firm—Donald R. Boys; Central Coast Patent Agency, Inc.

(57) ABSTRACT

A transaction server system is provided for routing and processing telephony events in a multi-tenant communication center. The transaction server system comprises a CTI-enabled routing point having transaction server software and multiple venues for receiving and notifying of telephony events according to venue, a plurality of virtual transaction server applications associated one each per venue for disposing of pending telephony events according to established protocols and an intermediary server disposed between and connected to the routing point and to the plurality of virtual transaction applications. The intermediary server maps communication paths between individual ones of the multiple venues of the routing point to individual ones of the virtual transaction applications and wherein each virtual transaction application functions on behalf of at least one tenant of the multi-tenant communication center to process events.

33 Claims, 5 Drawing Sheets (centrix approach)

(centrix approach)

*Fig. 4* (CTI-Linked Approach)

METHOD AND APPARATUS FOR ROUTING CALLS BY PROXY USING VIRTUAL TRANSACTION SERVERS IN A MULTI-TENNANT COMMUNICATION CENTER

FIELD OF THE INVENTION

The present invention is in the field of telephony communications, and pertains more particularly to methods and apparatus for routing calls incoming to a multi-tenant communication center.

BACKGROUND OF THE INVENTION

In the field of telephony services, there has been much improvement over the years concerning the routing and other treatment of telephony events. Telephony in general has become a computer-integrated service that can be practiced over a connection-oriented service network such as the well-known public-switched telephony network (PSTN), as well as over data-packet networks (DPN) such as the well-known Internet network. More recently telephony methods and techniques have been incorporated to function in a combination of connection-oriented and shared-bandwidth (DPN) networks.

However technically advanced a telephony system may be, it is still a goal of telephony providers as well as practitioners to experience a high-quality telephony service without incurring exponential costs related to provision of architecture, software, and other newly-advanced components. In a communication center environment, quality of service is critical. Routing flexibility and reliability are also highly important in achieving high quality of service to clients patronizing the center. Computer-Telephony-Integration (CTI) has enabled many improvements in the art of telephony.

In a CTI-enhanced communication system known to the inventor, intelligent routing is provided by a software application known as a transaction server (TS). Utilizing TS technologies, intelligent routing rules may be implemented both at agent level within the communication center itself (agent level routing) and in the realm of the external telephony network. In the latter case, agent-level routing may be performed at network level. Using this technology along with a separate dedicated network, information about callers attempting to contact the center may be passed to the center ahead of actual calls, thereby giving agents additional time to prepare for incoming calls on a call-to-call basis.

Interactive-voice-response technologies (IVR) may also be present and utilized both at network level and at agent level in communication centers known to the inventor. Integration with data networks has resulted in new voice formats such as voice over Internet protocol (VoIP), and others. Multi-capable communication centers, meaning that agents stationed therein interact with callers on either or both of a COST network and an IP network are known to the inventor. Also known are pure IP communication centers wherein there are no traditional COST connections required for agent's telephones. In this type of center, all calls, whether sourced from a COST network or from a data network, are handled utilizing LAN connected PCs and/or IP telephones.

In some communication centers, there are multiple tenants that share telephony resources for the purpose of serving separate customer bases. For example, two separate and distinct companies may share a call center for providing service advice to their respective customer bases. The tenants typically share the cost of telephony services including routing services and IVR services. A typical multi-tenant communication center has at least one LAN-connected agent working in the center for each tenant of the center, although this is not necessarily a requirement. One agent could represent more than one tenant. Hopefully, all calls arriving at the center and destined for a particular tenant are routed to the tenant's agent, or group of agents representing that tenant.

In a multi-tenant communication center as described above, routing software and IVR resources must be allocated or shared between all of the tenants. In many cases, multiple tenants of a single communication center are very different from one another in terms of products offered, nature of services provided, etc. Because all of the tenants share a common architecture including connected processors and other service machines, it becomes expensive to provide singular routing routines and personalized IVR services for each tenant. Therefore, generic routing routines and IVR services are typically provided tending to limit the quality of service experienced by clients calling into the center. The fact that the tenants share resources is not then necessarily transparent to the clients. Moreover, many possible routing preferences and IVR preferences desired by individual tenants that could be practiced on the architecture of the center are not implemented because of cost-sharing and equipment limitations.

Providing separate instances of routing software and IVR resources individually for each tenant of a multi-tenant communication center is not conventionally cost-effective. Similarly, it is not conventionally cost-effective to maintain a separate CTI link between a communication center or network switch and each of the tenants. Still, it is desired that individual tenants of a multi-tenant communication center share communication center resources, but still enjoy individual security and versatility with respect to servicing their clients.

What is clearly needed is a method and apparatus for providing shared secure and personalized telephony resources for all tenants subscribing to a multi-tenant communication center without requiring additional CTI links and other associated equipment.

SUMMARY OF THE INVENTION

In a preferred embodiment of the present invention, a transaction server system is provided for routing and processing telephony events in a multi-tenant communication center. The transaction server system comprises, a CTI-enabled routing point having transaction server software and multiple venues for receiving and notifying of telephony events according to venue, a plurality of virtual transaction server applications associated one each per venue for disposing of pending telephony events according to established protocols and an intermediary server disposed between and connected to the routing point and to the plurality of virtual transaction applications. The intermediary server maps communication paths between individual ones of the multiple venues of the routing point to individual ones of the virtual transaction applications and wherein each virtual transaction application functions on behalf of at least one tenant of the multi-tenant communication center to process events.

In one aspect, the CTI-enabled routing point is a telephony switch hosted in a telephony network. In another aspect, the CTI-enabled routing point is a telephony switch hosted within the multi-tenant communication center. In still another aspect, the CTI-enabled routing point is an Internet protocol router hosted on Internet network. In yet another aspect, the CTI-enabled routing point is an Internet protocol router hosted within the multi-tenant communication center and connected to the Internet.

In one aspect, the multiple venues are tenant-dedicated hardware ports of an interactive voice response resource associated with the routing point. In another aspect, the multiple venues are tenant-dedicated software channels of an interactive voice response resource associated with the routing point. In one embodiment, the multi-tenant communication center handles connection-oriented-switched-telephony. In another embodiment, the multi-tenant communication center handles Internet-protocol-network-telephony. In still another embodiment, the multi-tenant communication center handles all sorts of telephony, including conventional connection-oriented and all sorts of packet-switched telephony connection-oriented-switched-telephony and Internet-protocol-network-telephony. In a preferred aspect, the virtual transaction server applications are configurable wherein the configurations depend upon the main transaction server software structure for successful function.

In another aspect of the present invention, a mapping server is provided for mapping and establishing appropriate communication paths between multiple tenant-dedicated venues and multiple tenant-dedicated transaction server applications in a multi-tenant communication center environment. The mapping server comprises, at least one bi-directional port for establishing communication with at least one machine hosting the multiple venues, at least one bi-directional port for establishing communication with at least one machine hosting the multiple transaction server applications and a software table running on the server for updating and keeping track of the mapping assignments between the dedicated venues and the transaction server applications.

In one embodiment, the mapping server is connected to a CTI-enabled routing point comprising a telephony switch hosted in a telephony network. In another embodiment the mapping server is connected to a CTI-enabled routing point comprising a telephony switch hosted within the multi-tenant communication center. In still another embodiment, the mapping server is connected to a CTI-enabled routing point comprising an Internet protocol router hosted on Internet network. In yet another embodiment, it is connected to a CTI-enabled routing point comprising an Internet protocol router hosted within the multi-tenant communication center and connected to the Internet.

In one aspect, the multiple venues are tenant-dedicated hardware ports of an interactive voice response resource associated with a routing point. In another aspect, the multiple venues are tenant-dedicated software channels of an interactive voice response resource associated with a routing point. The virtual transaction server applications are configurable, in a preferred aspect, using individual desktop software applications established on computers enabled by LAN technology.

In still another aspect of the present invention, a software application is provided for emulating transaction server function in a CTI-enabled communication center. The software application comprises, a portion thereof for receiving communication event notification and for consulting main transaction protocols, a portion thereof for formulating and establishing a further-defined set of transaction protocols based on the main transaction protocols, a portion thereof for formulating and executing transaction orders based on the further-defined set of transaction protocols and a portion thereof for enabling modification of the further-defined set of transaction protocols.

In one aspect, all of the portions reside on a single machine. In another aspect, the portions are divided and strategically distributed to execute on more than one machine. In one embodiment, one of the machines is a personal computer having LAN and TCP/IP capability hosted within the communication center. In a variation to this aspect, one of the machines is a personal computer remote from the communication center having connection capability thereto using the Internet network.

In still another aspect of the present invention, a method is provided for sharing communication center resources in a multi-tenant communication center. The method comprises the steps of, (a) dividing the resources into separate venues assigned and dedicated one per tenant, (b) providing individually assigned and dedicated tenant applications capable of utilizing the resources, (c) providing an intermediary mapping application for connecting individual ones of the venues associated with the resources to individual ones of the tenant applications for communication of notifications of events and call-disposal instructions.

In one aspect of the method in step (a) the resources are IVR resources and the multi-tenant communication center is a connection-oriented-switched-telephony center. In another aspect, the resources are a combination of transaction server and IVR resources and the multi-tenant communication center is a connection-oriented-switched-telephony center. In one aspect of the method in step (a) the venues are hardware IVR ports. In another aspect, the venues are software IVR channels. In still another aspect of the method in step (a) the resources are IVR resources and the multi-tenant communication center is an Internet-protocol-network-telephony center. In this aspect, the multiple venues are software IVR channels.

In preferred application in step (b), the tenant applications are virtual transaction server applications depended from a main transaction server application. In another aspect of the method in step (c) the communication comprises at least sending notification of telephony events and parameters to be handled by the tenant applications according to call disposal rules.

Now, for the first time, a method and apparatus is provided for providing shared secure and personalized telephony resources for all tenants subscribing to a multi-tenant communication center without requiring additional CTI links and other associated equipment.

BRIEF DESCRIPTION OF THE DRAWING FIGURES

DESCRIPTION OF THE PREFERRED EMBODIMENTS

Figure 1:
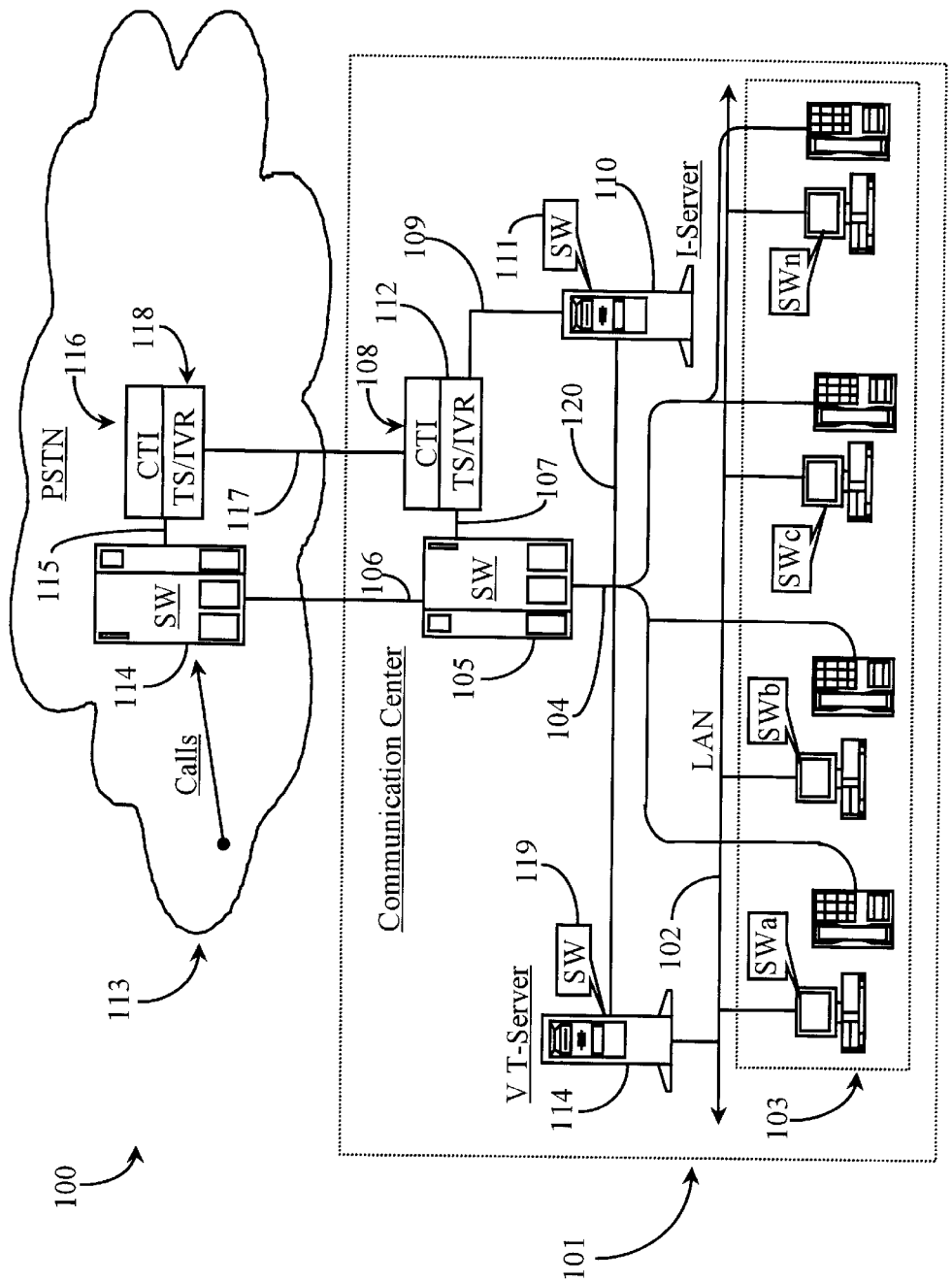
FIG. 1 is an architectural overview of a communication center and connected network wherein resource sharing is practiced according to an embodiment of the present invention.

FIG. 1 is an architectural overview of a communication center and connected network 100 wherein resource sharing is practiced according to an embodiment of the present invention. Communication network 100 comprises a multi-tenant communication center 101 and the well-known PSTN network 113.

PSTN 113 may instead be any private or public COST network. The inventor chooses PSTN 113 for illustration in this example because of its high public-access characteristic. PSTN 113 has a telephony switch (SW) 114 illustrated therein and adapted as a local call switch such as an automatic call distributor (ACD) or, perhaps a private branch exchange (PBX) type telephony switch. In some embodiments, switch 114 may be part of a service control point (SCP). Switch 114 is, in this example, CTI-enabled by virtue of a CTI processor 116 connected thereto by a CTI link 115. Processor 116 is illustrated herein as supporting an instance of a transaction server (TS) and an instance of IVR represented in this example by the element number 118. TS/IVR 118 may, in one embodiment, be provided as software on an adjunct peripheral connected to CTI processor 116. In another embodiment, TS/IVR 118 may be supported on two separate and dedicated peripherals connected to CTI processor 116, one peripheral dedicated to IVR function and one to TS function. There are many possible architectures.

Switch 114 represents a last stop in P STN 113 for calls, represented herein by a vector labeled Calls, destined for center 101. It will be appreciated that there will be many more telephony switches and other carrier equipment and connections than is illustrated in this simplified example. The inventor illustrates only one switch and CTI capability and deems such illustration sufficient for explanation of the present invention. CTI enhancement to switch 114 is not specifically required in order to successfully practice the present invention as long as the capability is at least provided as enhancement to a connected communication-center switch.

As previously described, communication center 101 is a multi-tenant center, meaning that a plurality of enterprises share communication-center telephony resources and architecture. A central telephony switch (SW) 105 is illustrated within communication center 101 and adapted as a central office-type telephony switch for internal call distribution within center 101. Switch 105 is connected to switch 114 within PSTN 113 via at least one COST telephony trunk 106. A CTI processor 108 is illustrated within center 101 and is connected to switch 105 via a CTI link 107. Processor 108 is adapted to support an instance of TS/IVR 112 as was described with reference to processor 116 and TS/IVR 118 of PSTN 113. Processor 108 is connected to processor 116 by a digital data network 117 separate and distinct from telephony trunk 106. This illustrated CTI architecture is known to the inventor and implemented for the purpose of enabling intelligent routing routines and other controls to be initiated at switch 114 within PSTN 113. Such controls and routines are provided to switch 114 from within communication center 101 or from within other associated communication centers (not shown).

One benefit of CTI and TS/IVR enhancement at both telephony switches 114 and at 105 is that information about callers can be passed to communication center 101 ahead of actual routed calls. Other benefits include agent-level-routing capabilities at network level and passing agent status information to network level before calls are routed, such as during IVR interaction with callers.

Communication center 101 has an operator center 103 provided therein having agent stations manned with agents representing tenants of the center. Each agent station within an operator center 103 has at least a personal computer and a telephone. In this example there are 4 personal computers and associated agent telephones illustrated within operator center 103. Therefore, it may be presumed for exemplary purposes that there are 4 agents working within communication center 101 and answering calls. It is reminded herein that in this example it is presumed that one agent represents one tenant of communication center 101 for exemplary purposes only. It will be appreciated by the skilled artisan that there may be many agents or groups of agents representing a plurality of tenants of communication center 101 without departing from the spirit and scope of the present invention.

Each personal computer within region 103 is illustrated as connected to a local-area-network (LAN) 102. The agent telephones illustrated within domain 103 are connected to central switch 105 by way of internal telephony wiring 104. Communication center 101 is illustrated in this example as a COST communication center. Cost calls (represented by vector Calls within PSTN 113) arriving at switch 114 are routed to switch 105 within communication center 101. Call connections are established over telephone wiring 104 to appropriate agent telephones within domain 103. Information about callers appears in a monitor-displayed format on appropriate ones of agent computers within domain 103, the information arriving thereto by way of LAN 102.

The IVR portion of TS/IVR 112 is separated or channeled such that a single channel may be dedicated as a resource for a single tenant of communication center 101. The described separation is not illustrated in this example, but is further decribed in enabling detail later in this specification. A novel intermediary server (I-Server) 110 is provided within communication center 101 and illustrated as connected to TS/IVR 112 by a data link 109. A novel virtual T-server (VT-Server) 114 is provided within communication center 101 and illustrated as connected directly to I-server 110 by a data link 120. VT-server 114 is illustrated as further connected to LAN 102 within communication center 101 and therefore accessible to agents operating within domain 103.

The TS portion of TS/IVR 112 represents transaction server software adapted to control switch 105 according to communication-center routing capabilities. The TS portion of TS/IVR 118 within PSTN 113 is similarly adapted to control switch 114 at network level. It will be appreciated that certain routines and controls executed within PSTN 113 over switch 114 vary somewhat from those executed within communication center 101 over switch 105. However, TS software represented by elements 118 and 112 provide the main intelligence for routing calls within PSTN 113 and in communication center 101.

VT-server 114 has an instance of software (SW) 119 installed thereon and configured to provide virtual routing and transaction intelligence that can be manipulated and personalized by individual tenants of communication center 101. SW 119 is equally partitioned or provided in separate instances in accordance with the number of subscribing tenants operating within communication center 101. For example, if there are 4 tenants operating within communication center 101 than there are 4 instances of SW 119, one instance per tenant.

SW 119 is configurable per instance and communicates with TS/IVR 112 and/or TS/IVR 118 through I-server 110 acting as an intermediary mapping server. I-server 110 has a software instance (SW) 111 installed therein and adapted to broker communication and map communication paths between individual tenants of communication center 101 and TS/IVR functionalities 112 and/or 118. Each individual tenant's instance of SW 119 within the VT-server 114 by way of LAN 102 and tenant software (SW) applications a–n is illustrated herein as distributed to agent computers within domain 103. SW applications a-n provide respective agents representing tenants of communication center 101 with the capability of logging into VT-server 114 and subscribing to their personal instance of SW 119.

In practice of the present invention, incoming calls represented by vector within PSTN 113 arrive at communication center switch 105 and must then be routed to appropriate agents representing the tenants of the communication center. For this purpose, IVR function (112) is channeled such that at least one channel is dedicated to a single tenant.

I-server 110 by virtue of SW 111 maps dedicated IVR channels to appropriate instances of VT-server (SW) 119 subscribed to by the tenants. Agents representing the tenants operating SW applications a–n, in this example, Login and receive their telephony transactions through respective VT-server instances 119. Using the architecture and software instances as described in this example enables the shared resources to remain generic at higher level but personalized at an agent level. For example, an agent within domain 103 operating SWa can access his or her dedicated VT-server and make changes in routing rules and IVR specifics provided the generic forms of those capabilities are retained and TS/IVR 112 and/or TS/IVR 118. In this way all agents representing separate tenants may equally share main resources that still have personalization capability further individual portions of the total resource.

A benefit of utilizing VT-server technology in terms of connection costs is that only one CTI link 107 is required to switch 105. Communication between servers 110, 114 and TS/IVR 112 is performed through machine-readable messaging. VT-server 114 does not require a CTI link to any telephony switch. Provision of completely separate and dedicated IVRs and transaction servers (individualized) to each of multiple tenants within a communication center is cost prohibitive in terms of added CTI links and other equipment. Providing a single IVR and transaction server that must be shared by all the tenants without benefit of the present invention is limited to generic capabilities practiced in the same way for all the tenants. The methods and apparatus of the present invention enable tenant personalization of routing and IVR interaction rules while still sharing the total resource with all the other tenants operating within the center.

It will be apparent to one with skill in the art that the example of FIG. 1 represents just one simplified communication-center network practicing CTI-enabled COST telephony. However, the present invention is not limited to COST telephony as is discussed below.

Figure 2:
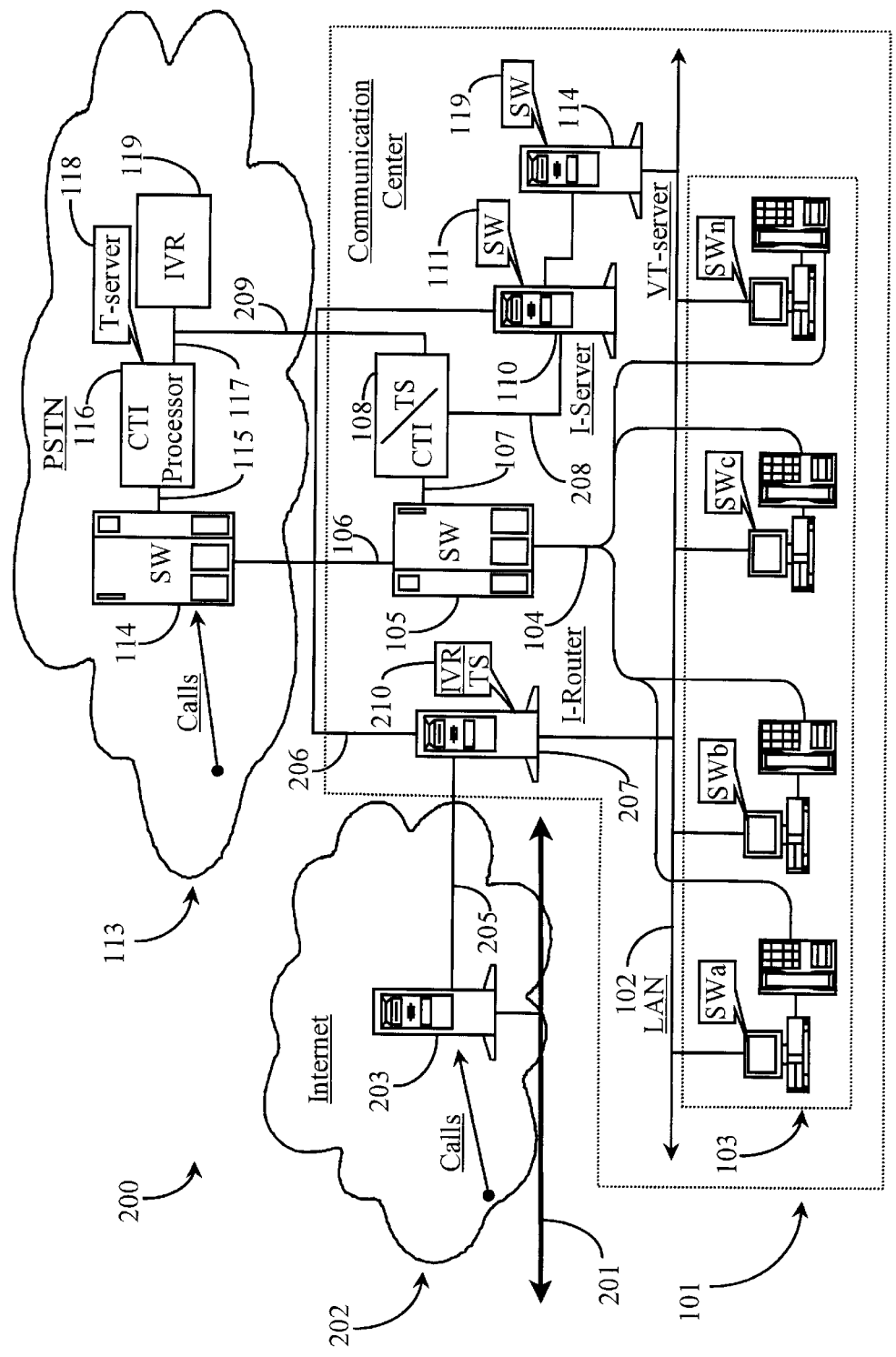
FIG. 2 is an architectural overview of a multi-capable communication center and connected network wherein resource sharing is practiced according to an embodiment of the present invention.

FIG. 2 is an architectural overview of a multi-capable communication center and connected network 200 wherein resource sharing is practiced according to a somewhat more complex embodiment of the present invention. Network 200 comprises the well-known PSTN network 113, communication center 101, and the well-known Internet network 202. Communication center 101 is enhanced in this example with equipment and software in enabling Internet-protocol-network-telephony (IPNT), including connection-oriented, switched IP telephony using SIP. Communication center 101 is also capable of handling COST telephony as was described with reference to FIG. 1 above. Therefore, many components illustrated in this example shall retain the same element numbers of their counterparts represented with respect to FIG. 1.

Telephony switch 114 illustrated within PSTN 113 accepts calls sourced from anywhere within PSTN 113 as illustrated by vector labeled Calls. In this example, CTI processor 116 provides CTI enhancement to switch 114 by way of CTI link 115. IVR capability is now shown separately from TS 118 and is now labeled with element number 211. IVR 211 is an adjunct peripheral connected to CTI processor 116 by way of a CTI link 117 in this embodiment. The main difference between this PSTN architecture and that described with reference to FIG. 1 is simply that IVR 211 is now provided as a separate machine running IVR software. Switch 114 routes calls destined to communication center 101 over telephony trunk 106 to central switch 105 as previously described.

Switch 105 in communication center 101 is CTI-enabled by virtue of processor 108 connected thereto by CTI link 107. In this example, there is no IVR software operating within communication center 101. Therefore, IVR 210 represents the only IVR functionality for COST callers attempting to reach center 101. Processor 108 provides CTI enhancement and TS functionality to switch 105. Processor 116 and IVR 119 share a data-network connection 209 to processor 108 within communication center 101. The inventor intends to illustrate by the absence of IVR functionality within center 101 that practice of the present invention does not depend on where or how the IVR resource is connected to work in association with the communication center.

Internet network 202 comprises an Internet backbone 201, which represents all of the lines, equipment and connection points that make up the Internet network as a whole. Therefore there are no geographic limitations to the practice of the present invention. An Internet server 203 is illustrated within network 202 and adapted as a data-network access point for network customers attempting to contact communication center 101 by way of, in this example, the Internet. Server 203 is illustrated connected to backbone 201. Incoming calls to server 203 are represented herein by a vector labeled Calls. Server 203 may be hosted by the enterprises, or any one of them, hosting communication center 101. Interaction with communication center 101, in this example, involves both COST telephony and IPNT. Switch 105 is connected to agent telephones within domain 103 via telephone wiring 104 as was the case with respect to FIG. 1.

An Internet router (I-Router) 207 is provided within communication center 101 and adapted as an Internet protocol (IP data router). Router 207 is connected to server 203 by way of an Internet access line 205. All communication events sourced from Internet 202 arrive at router 207 before internal routing to agents. Router 207 is illustrated as connected to LAN 102 but this is not specifically required in order to successfully practice the present invention. Direct connection to LAN 102 represents a convenience in that router 207 handles e-mails, electronic faxes, as well as live data-network-telephony (DNT).

Router 207 has an instance of IVR/TS software 210 installed thereon and adapted as a DNT version of the software used in conjunction with COST networks. Therefore, router 207 has voice interaction capability as well as intelligent routing capability. Router 207 is illustrated as connected to I-server 110 by a data link 206. Similarly, CTI processor 108 is connected to server 110 by a data link 208. In this example, server 110 by virtue of SW 111 is capable of mapping a plurality of channels associated with IVR 211 within PSTN 113 and a plurality of channels associated with IVR 210 to appropriate VT-server instances 119 in server 114. In this case, each agent operating within domain 103 using SW instances a–n subscribes to his or her own VT application and now has personalized DNT and COST routing and IVR interaction capabilities.

Router 207, server 110, and server 114 communicate with each other using machine-readable messaging capabilities. There are many applicable messaging protocols known in the art, some of which are also human readable and can also be used. Assuming that each grouping of computer and telephone (agent station) within domain 103 represents a singular tenant, then there are four tenants in this example. Each of the 4 tenants may have different routing and IVR implementations than those of their counterparts. The only requirement is that the personalized building blocks are applicable to the generic construction and configuration of the main IVR and TS resource.

In this example, each telephone within domain 103 is connected to its associated computer using a telephone-to-soundcard connection. In this way IPNT events may also be answered using the telephone. In this respect, telephones in this example are multi-capable as well. Again it is noted herein that agents representing tenants operating within domain 103 may utilize SW instances a–n for the purpose personalizing their IVR presentations and T-server functions.

It will be apparent to one with skill in the art that exact channeling or partitioning of IVR resources may be implemented in a software or in hardware sense without departing from the spirit and scope of the present invention. Similarly, separate instances of VT-server application 119 (one per tenant) may be provided in separate hardware structures for security reasons, or maybe software divided or created within one machine. In one embodiment of the present invention, software instances a–n residing on respective computers and domain 103 may function as VT-server applications thereby eliminating the need for VT-server 114. In this case I-server 110 would be directly connected to LAN 102. There are many possibilities.

Figure 3:
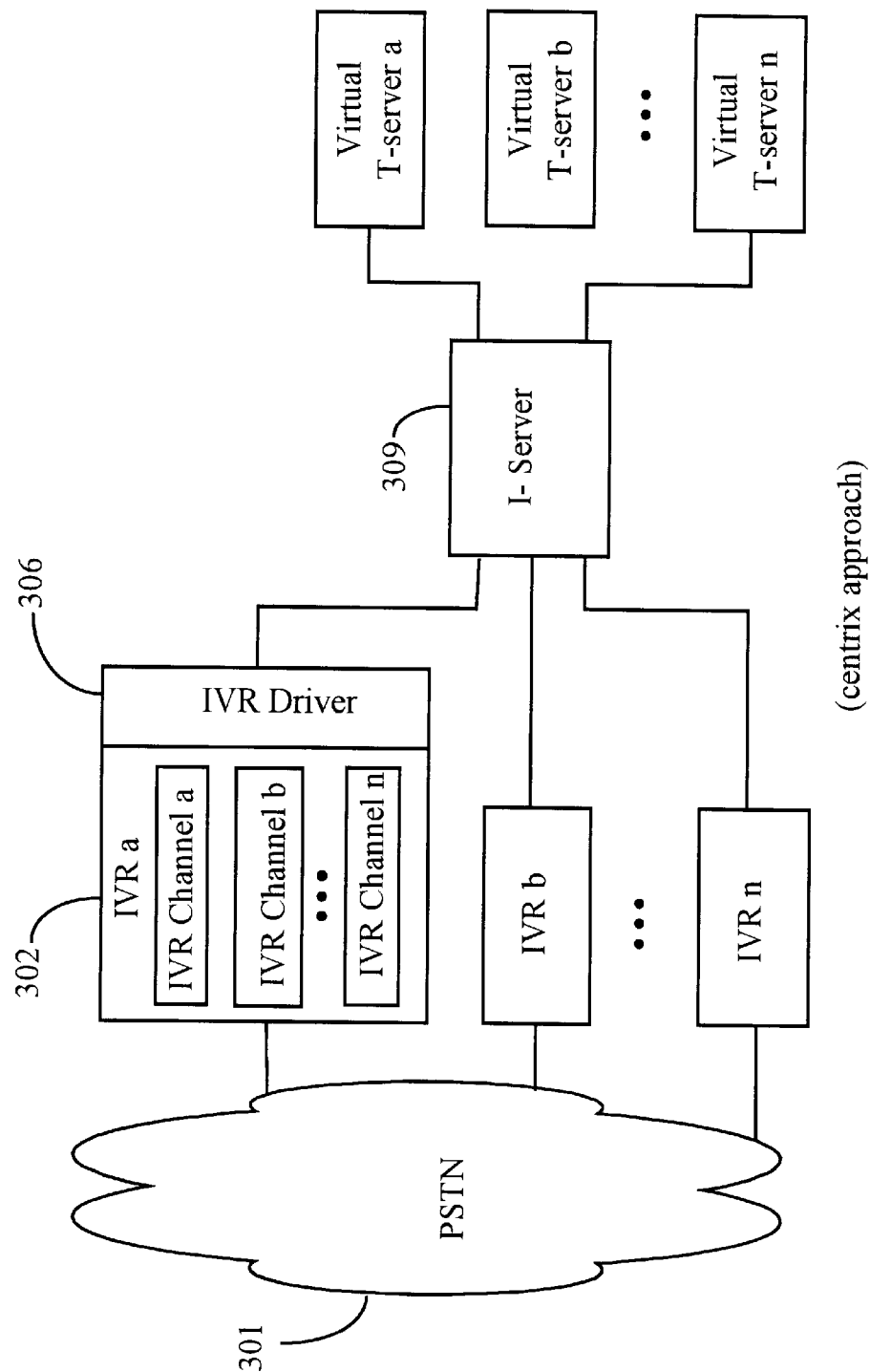
FIG. 3 is a block diagram illustrating IVR resource partition and mapping according to an embodiment of the present invention.

FIG. 3 is a block diagram illustrating IVR resource partition and mapping according to an embodiment of the present invention. In one aspect of the present invention, multiple separate IVRs may be provided within a communication center and linked to telephony resources within the PSTN or other COST network. For example, an IVR 302 is provided having separate IVR channels a–n communicating through an IVR driver 306 and data trunk to an I-server 309. Also provided within the same center are IVRs b–n also ported to I-server 309. In this example, IVRs b–n are presumed to be identical to IVR (302) having drivers analogous to driver 306 and a plurality of IVR channels a–n. In this aspect, the IVR resource is scalable simply by adding new machines and linking them into the PSTN network, typically, to a local telephony switch analogous to switch 114 of FIG. 1. In this case, TS and CTI switching resources are hosted within the PSTN and not illustrated. There may or may not be IVR resources present within PSTN 301.

A plurality of virtual T-servers a–n is illustrated as ported to I-server 309 on its opposite side of IVR ports. In one example virtual T-servers a–n are associated with IVR channels a–n of IVR 302. If this is true, IVRs b–n represent unused resources. I server 309 by virtue of software as previously described maps each IVR channel to its appropriate VT-server. If any IVR channel assignment is changed to a new tenant and therefore a new VT-server, I-server 309 keeps track of the update. Similar to a router, I-server 309 routes messages from the VT-server side to the IVR side and in reverse order. It will be appreciated that IVR channels, for example, and IVR 302 are software channels and only one port is required I server 309. In this example, a separate port is utilized for each VT-server, however this is not required to practice the present invention as VT-server software may be partitioned into dedicated portions running on one machine. Similarly, additional VT-server instances may be added or subtracted according to need without hard wiring. One VT-server handles telephony processing for one tenant. On the IP side of, for example, a multi-capable center analogous to center 101 with reference to FIG. 2, well-known soft-switch protocols may be used for messaging such as H.323, session-initiated protocol (SIP), or voice-over-Extensible-Markup Language (VoXML).

In this particular example, CTI and T-server resources are hosted within PSTN 301 as previously described above. When incoming telephony events are detected and accepted per IVR channel, tenant dependent information (TDI) is concatenated into the IVR notification to I-server 309. This information may include dialed-number-identification-service (DNIS), and account number, or other information that may be used to identify an appropriate VT-server to handle the event. Similarly, caller information and information solicited by IVR may also be embedded into the messaging. Internal routing will be based in part on the VT handling of events based on IVR interaction and, of course, on availability of an agent of the tenant to which the call is intended. It is possible that messaging is propagated back and forth between network level (CTI/TS) and VT resource through I-server 309 for the purpose of determining final routing.

Because there is no direct link between I-server 309 and the main TS server with a CTI link-to-switch, tenant updating or modifying of IVR presentation and available routing capabilities must be conducted through I-server 309 and appropriate IVR channels. In one embodiment, IVR resources are enhanced with a capability for accepting change orders from tenants through VT-server applications and communicating those orders to PSTN-hosted CTI and TS resources.

Figure 4:
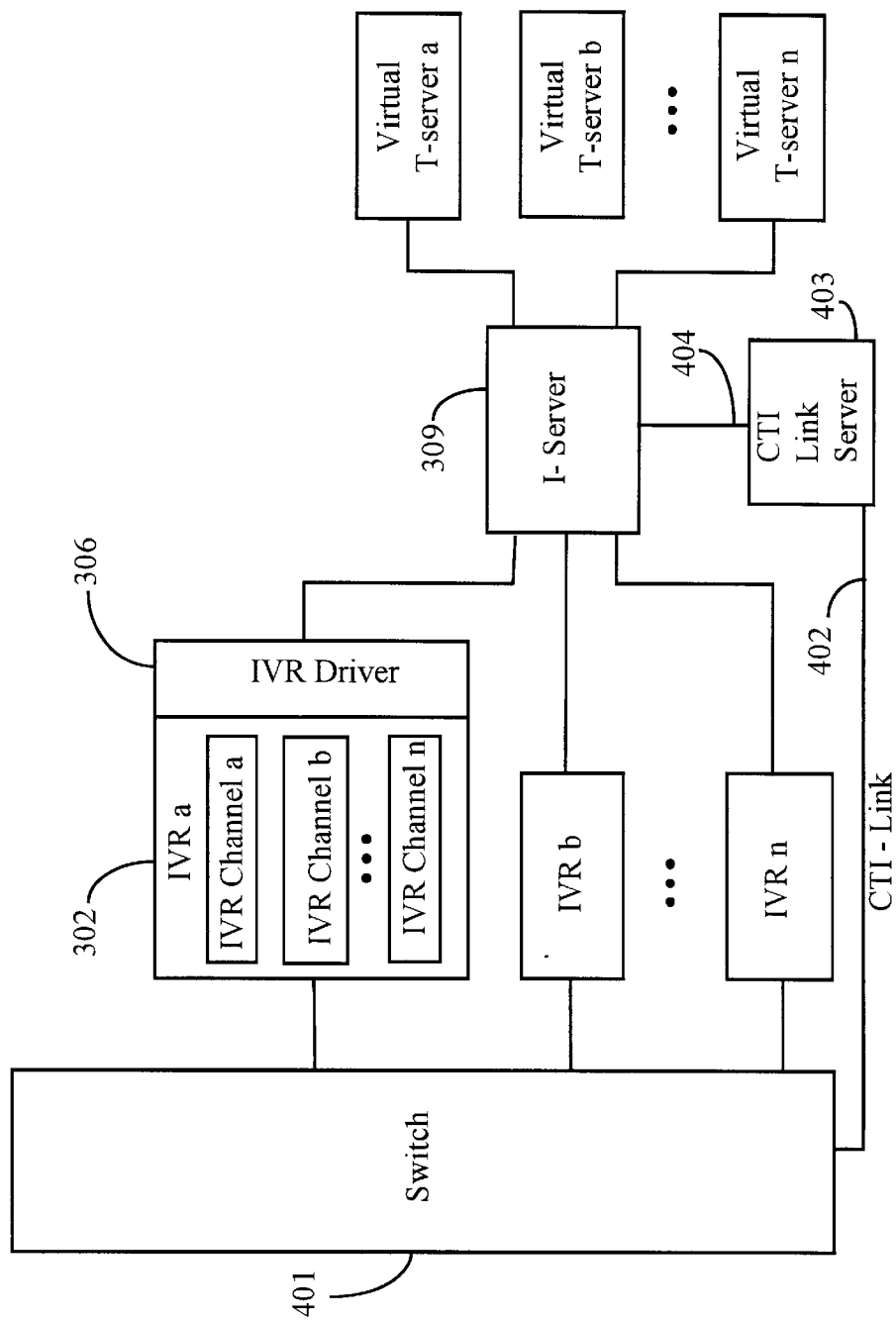
FIG. 4 is a block diagram illustrating IVR resource partition and mapping according to another embodiment of the present invention.

FIG. 4 is a block diagram illustrating IVR resource partition and mapping according to yet another embodiment of the present invention. In this example, the IVR, I-server, and VT-server components are identical to those described with reference to FIG. 3 above and therefore shall not be reintroduced. Additional components in this example include a CTI-linked T-server 403 illustrated herein as connected to I-server 309 by a datalink 404. T-server 403 is presumed analogous to processor 108 described with reference to FIG. 1 of this specification. T-server 403 is illustrated herein as connected to a switch 401 by a CTI link 402. Switch 401 is presumed analogous to a central telephony switch similar to switch 105 described with reference to FIG. 1 and FIG. 2.

In this example, I-server 309 may separate IVR function and TS function with respect to organization and communication. For example, when a telephony event arrives at switch 401 and is routed to a particular IVR channel for interaction, TS data, caller information, and destination information, may be routed to I-server 309 from switch 401 over CTI link 402 and through T-server 403. A plurality of messages may be sent back and forth between I-server 309 and switch 401 over the main CTI link (402) during IVR interaction and before final routing determination is made. All intelligent routing routines that may be available within a communication center are applicable in this embodiment. In this case, IVR resources a–n may be implemented as dedicated IVR resources requiring no enhancement or modification in order to practice the present invention. All mapping information including tenant identification (static), IVR channel identification (static), caller identification (dynamic), and so on is continually updated and maintained within I-server 309 for each call event on behalf of a communication center tenant. A tenant's VT-server application is notified when it must process an incoming call and responds appropriately with correct final routing determination. In one embodiment, if there is a change and tenant status in terms of machine location of agents representing the tenant within the communication center or availability of an agent or agents with respect to multiple tasks, such information may be updated dynamically to I-server 309 for mapping purposes.

Figure 5:
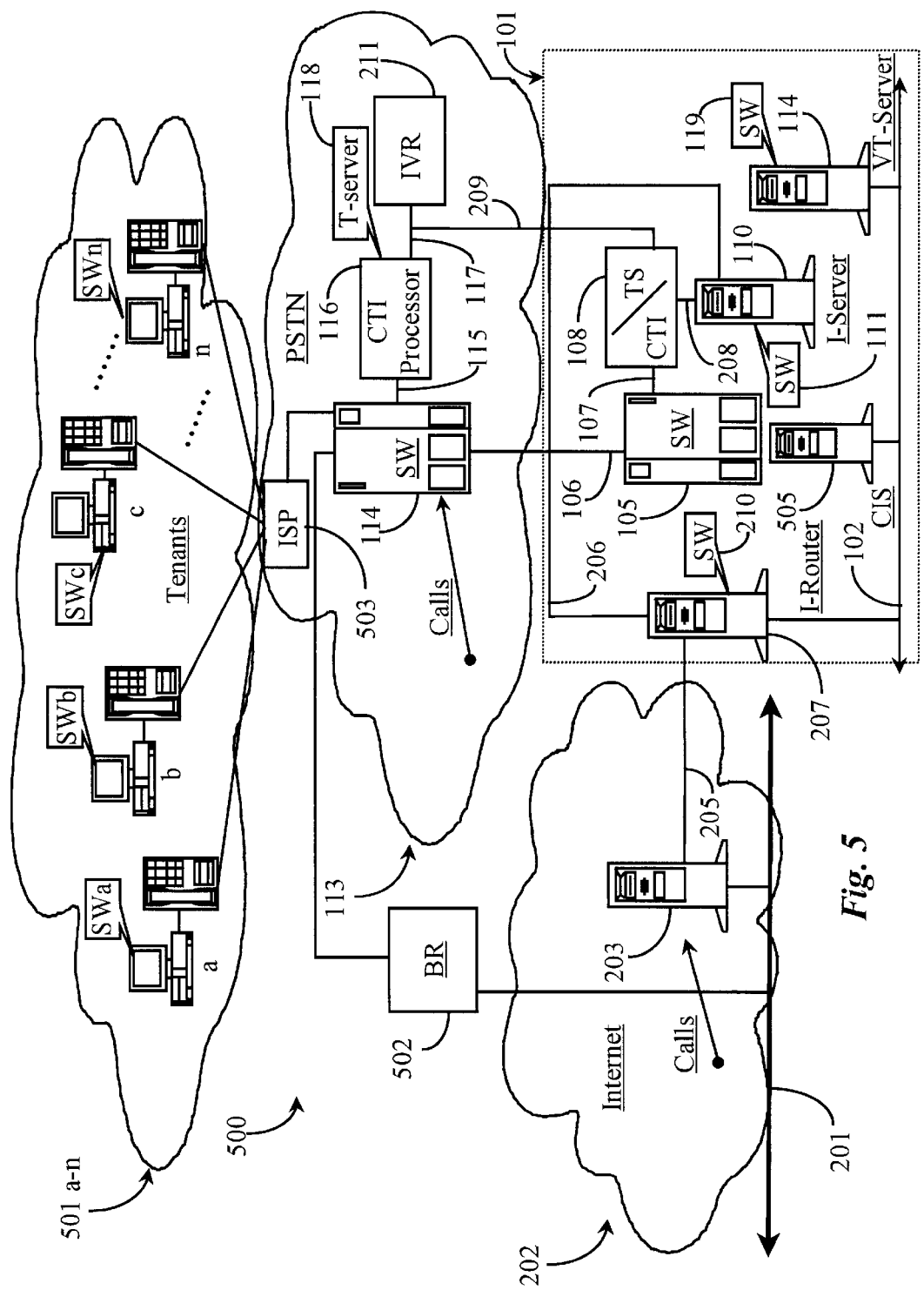
FIG. 5 is an architectural overview of a virtual communication-center and connected network wherein resource sharing is practiced according to yet another embodiment of the invention.

FIG. 5 is an architectural overview of a virtual communication-center and connected network 500 wherein resource sharing is practiced according to yet another embodiment of the invention. Communication center 101, in this example, is a virtual communication center meaning that there are no agents or operators answering calls physically within the center.

Tenants subscribing to virtual communication center 101 are represented in this example as remote agents 501a–n. Each agent's equipment group comprising, essentially, a computer and connected telephone is Internet-capable. Software (SW) applications a–n illustrated in this example are distributed on respective agent computers within cloud 501 a–n the same manner as was described with reference to FIGS. 1 and 2. Each tenant or agent a–n represented within cloud 501 has an Internet connection to an Internet service provider (ISP) 503 as is illustrated logically herein by connection lines drawn from individual agents phones to ISP 503 within PSTN 113. It will be appreciated herein that there are many known methods for establishing remote Internet connections including cables/modem, digital-subscriber-line (DSL), integrated-services-digital-network (ISDN), and so on.

ISP 503 is adapted to provide Internet services for remote agents 501a–n. Although it is not shown in this example, ISP 503 may be presumed to contain a telephone modem bank as well as an Internet connection server. In this example, ISP 503 is connected to telephony switch 114 within PSTN 113 by way of telephony trunk. ISP 503 is also directly connected to Internet backbone 201 by way of an Internet access line 506. Switch 114 also has a connection to a network bridge 502 that is adapted to convert calls between Internet 202 and PSTN 113 and reverse order.

In this example, calls may reach virtual communication center 101 from anywhere in PSTN 113 as represented by the vector labeled Calls. Similarly, access to communication center 101 may be achieved by calling from anywhere within Internet 202, incoming calls also represented by vector labeled Calls. Additionally, Internet callers may place a COST call to communication center 101 from Internet 202 through bridge 502 and into PSTN 113. In yet another aspect, PSTN callers may initiate DNT calls through a network bridge 502 and subsequently Internet network 202. This example represents seamless telephony practiced between the disparate networks of PSTN 113 and Internet 202 from the viewpoint of virtual communication center 101.

In this embodiment, tenants or agents 501 a–n subscribe to their VT-server applications (SW 119) through ISP 503 and either a PSTN (113) route or an Internet (202) route. A customer-information-server (CIS) is provided and illustrated as connected to LAN 102 of communication center of 101. CIS server 505 contains information about customers such as account number, contact information, purchase histories, and other conceivable types of useful information.

The configuration of I-server, I-router, and VT-server is virtually identical to the configuration shown with respect to communication center 101 of FIG. 2. The difference in this example is that there are no LAN-connected tenants (agents) within center 101 to except routed calls. In this embodiment, all communication events detected are routed in an outbound sense to agents 501a–n through a PSTN outbound path or through an Internet outbound path. For example, if tenant 501b has pending COST telephony events detected at VT-server 114, those events may be routed from switch 105 over trunk 106 into switch 114, through ISP 503, and to the telephone of tenant b. This presumes that the original call or calls were actually routed from switch 114 into switch 105. In one aspect, actual calls are not routed to switch 105, rather call-notifications are routed to switch 105 where they may be detected by server 114 and the appropriate VT-server application 119. It is noted herein that in this example, COST IVR resource (211) is hosted within PSTN 113.

DNT events originating within Internet 202 at server 203 may be routed over Internet access line 205 into I-router or 207 were IVR interaction may occur by virtue of SW 210 having IVR and TS functionality. Live IPNT calls are routed back through server 203 and on to backbone 201, over Internet pipeline 506 to ISP 503, and on to an appropriate agent 501a–n. In another embodiment, agents or tenant within group 501 may receive IPNT calls on their COST telephones. In this case, live events are routed through a network bridge 502 and into telephone switch 114 and routed on to agents COST phones either through ISP 503 or directly over standard POTS telephony lines. In this example, the fact that agents representing tenants operate remotely enables communication center 101 to cut further costs associated with agent equipment and LAN connections.

It will be apparent to one with skill the art that the methods and apparatus of the present invention may be practiced in a wide variety of architectures including in combined and integrated networks as is illustrated in this specification without departing from the spirit and scope of the invention. There are many alterations that may be made in embodiments described above, and there are many other embodiments within the spirit and scope of the invention. One such is that, although the system has been described in the examples as routing calls to active agents, agents may not be real people, but may be automated systems such as IVRs. The methods and apparatus of the present invention should be afforded the broadest scope possible under examination. The spirit and scope of the present invention should be limited only by the claims that follow.

What is claimed is:

1. A transaction server system for routing and processing telephony events in a multi-tenant communication center comprising:

a CTI-enabled routing point having transaction server software and multiple venues for receiving and notifying of telephony events according to venue;

a plurality of virtual transaction server applications associated one each per venue for disposing of pending telephony events according to established protocols; and an intermediary server disposed between and connected to the routing point and to the plurality of virtual transaction applications;

characterized in that the intermediary server maps communication paths between individual ones the multiple venues of the routing point to individual ones of the virtual transaction applications and wherein each virtual transaction application functions on behalf of at least one tenant of the multi-tenant communication center to process events.

2. The transaction server system of claim 1 wherein the CTI-enabled routing point is a telephony switch hosted in a telephony network.

3. The transaction server system of claim 1 wherein the CTI-enabled routing point is a telephony switch hosted within the multi-tenant communication center.

4. The transaction server system of claim 1 wherein the CTI-enabled routing point is an Internet protocol router hosted on Internet network.

5. The transaction server system of claim 1 wherein the CTI-enabled routing point is an Internet protocol router hosted within the multi-tenant communication center an connected to the Internet.

6. The transaction server system of claim 1 wherein the multiple venues are tenant-dedicated hardware ports of an interactive voice response resource associated with the routing point.

7. The transaction server system of claim 1 wherein the multiple venues are tenant-dedicated software channels of an interactive voice response resource associated with the routing point.

8. The transaction server system of claim 1 wherein the multi-tenant communication center handles connection-oriented-switched-telephony.

9. The transaction server system of claim 1 wherein the multi-tenant communication center handles Internet-protocol-network-telephony.

10. The transaction server system of claim 1 wherein the multi-tenant communication center handles both connection-oriented-switched-telephony and Internet-protocol-network telephony.

11. The transaction server system of claim 1 wherein the virtual transaction server applications are configurable wherein configurations depend upon the main transaction server software structure for successful function.

12. A mapping server for mapping and establishing appropriate communication paths between multiple tenant-dedicated venues and multiple tenant-dedicated transaction server applications in a multi-tenant communication center environment comprising:

at least one bi-directional port for establishing communication wit at least one machine hosting the multiple venues;

at least one bi-directional port for establishing communication with at least one machine hosting the multiple transaction server applications; and a software table running on the server for updating and keeping track of the mapping assignments between the dedicated venues and the transaction sever applications.

13. The mapping server of claim 12 connected to a CTI-enabled routing point comprising telephony switch hosted in a telephony network.

14. The mapping server of claim 12 connected to a CTI-enabled routing point comprising telephony switch hosted within the multi-tenant communication center.

15. The mapping server of claim 12 connected to a CTI-enabled routing point comprising Internet protocol router hosted on Internet network.

16. The mapping server of claim 12 connected to a CTI-enabled routing point comprising Internet protocol router hosted within the multi-tenant communication center an connected to the Internet.

17. The mapping server of claim 12 wherein the multiple venues are tenant-dedicated hardware ports of an interactive voice response resource associated with a routing point.

18. The mapping server of claim 12 wherein the multiple venues are tenant-dedicated software channels of an interactive voice response resource associated with a routing point.

19. The transaction server system of claim 11 wherein the virtual transaction server applications are configurable using individual desktop software applications established on computers enabled by LAN technology.

20. A software application for emulating transaction server function in a CTI-enabled communication center comprising:

a portion thereof for receiving communication event notification and for consulting main transaction protocols;

a portion thereof for formulating and establishing a further-defined set of transaction protocols based on the main transaction protocols;

a portion thereof for formulating and executing transaction orders based on the further-defined set of transaction protocols; and a portion thereof for enabling modification of the further-defined set of transaction protocols.

21. The software application of claim 20 wherein all of the portions reside on a single machine.

22. The software application of claim 20 wherein the portions are divided and strategically distributed to execute on more than one machine.

23. The software application of claim 20 wherein one of the machines is a personal computer having LAN and TCP/IP capability hosted within the communication center.

24. The software application of claim 20 wherein one of the machines is a personal computer remote from the communication center having connection capability thereto using the Internet network.

25. A method for sharing communication center resources in a multi-tenant communication center comprising steps of:

(a) dividing the resources into separate venues assigned and dedicated one per tenant;

(b) providing individually assigned and dedicated tenant applications capable of utilizing the resources;

(c) providing an in intermediary mapping application for connecting individual ones of the venues associated with the resources to individual ones of the tenant applications for communication of notifications of events and call-disposal instructions.

26. The method of claim 25 wherein in step (a) the resources are IVR resources and the multi-tenant communication center is a connection-oriented-switched-telephony center.

27. The method of claim 25 wherein in step (a) the resources are a combination of transaction server and IVR resources and the multi-tenant communication center is a connection-oriented-switched-telephone center.

28. The method of claim 25 wherein in step (a) the venues are hardware IVR ports.

29. The mete of claim 25 wherein in step (a) the venues are software IVR channels.

30. The meted of claim 25 wherein in step (a) the resources are IVR resources and the multi-tenant communication center is an Internet-protocol-network-telephony center.

31. The method of claim 30 wherein in step (a) the multiple venues are software IVR channels.

32. The method of claim 25 wherein in step (b) the tenant applications are virtual transaction server or applications depended from a main transaction server application.

33. The method of claim 25 wherein in step (c) the communication comprises at least sending notification of telephony events and parameters to be handled by the tenant applications according to call disposal rules.

* * * * *